87
W. F. Edson,
Heel Machine,
No. 290, A.I. Patented July 24, 1860.
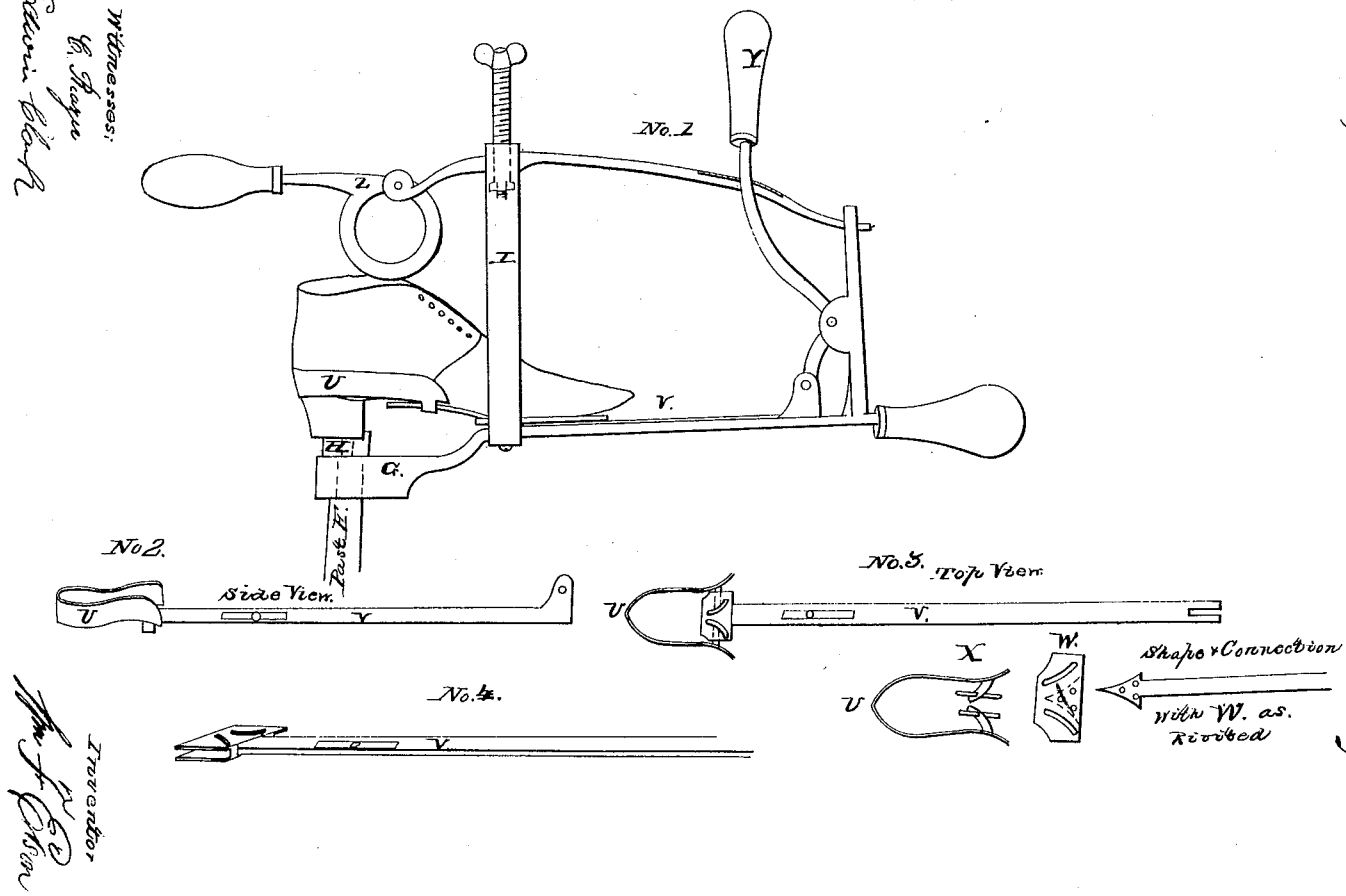
N. PETERS, PHOTO-LITHOGRAPHER, WASHINGTON, D. C.